INVENTOR
James E. Hawkins

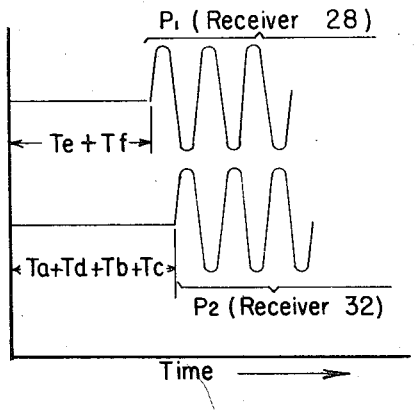
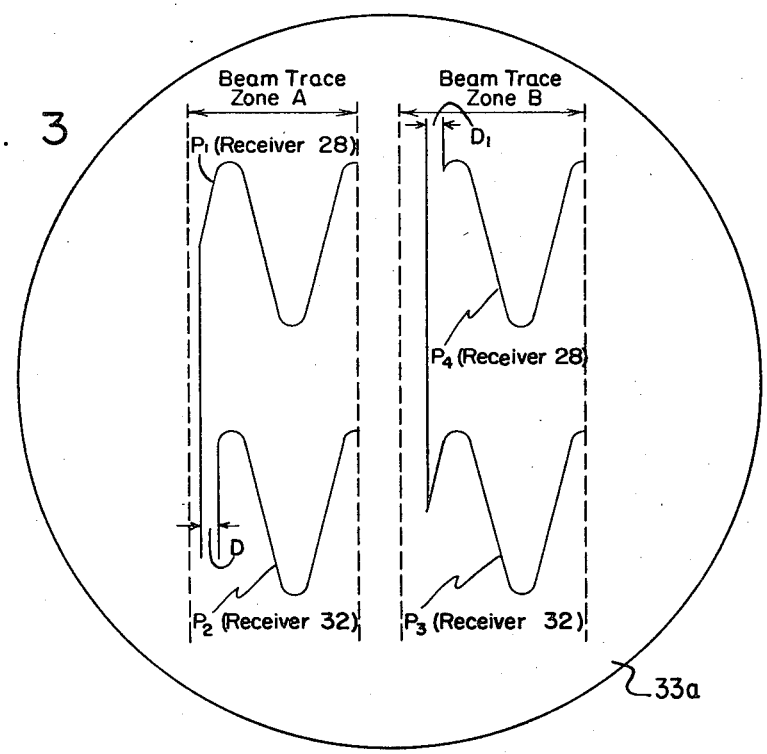

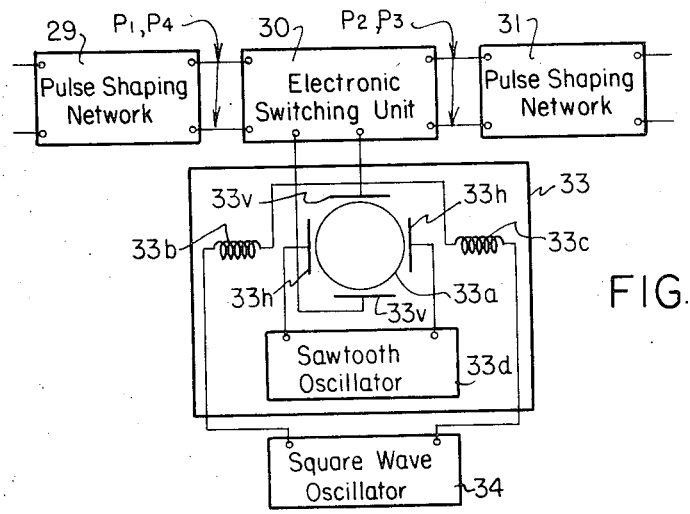
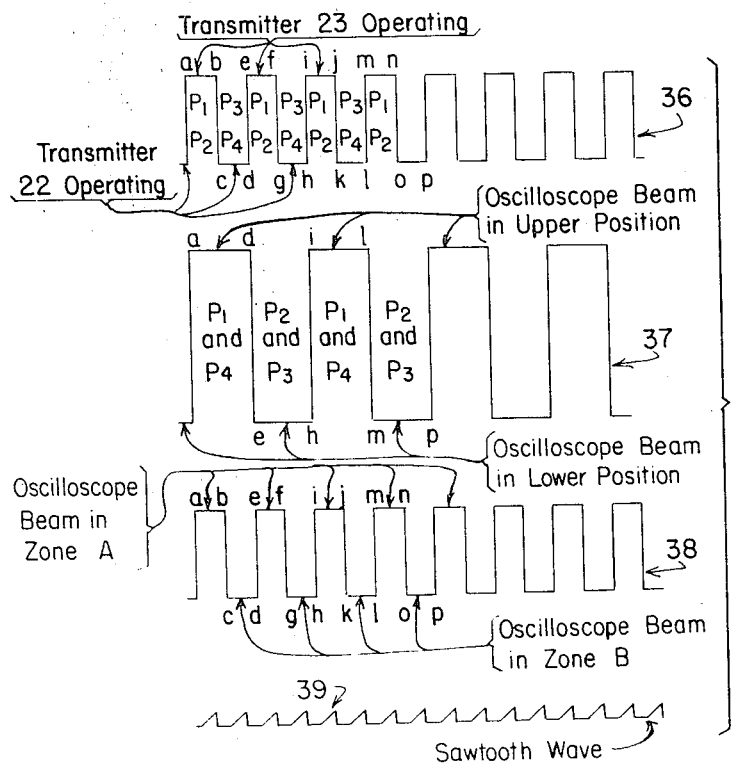

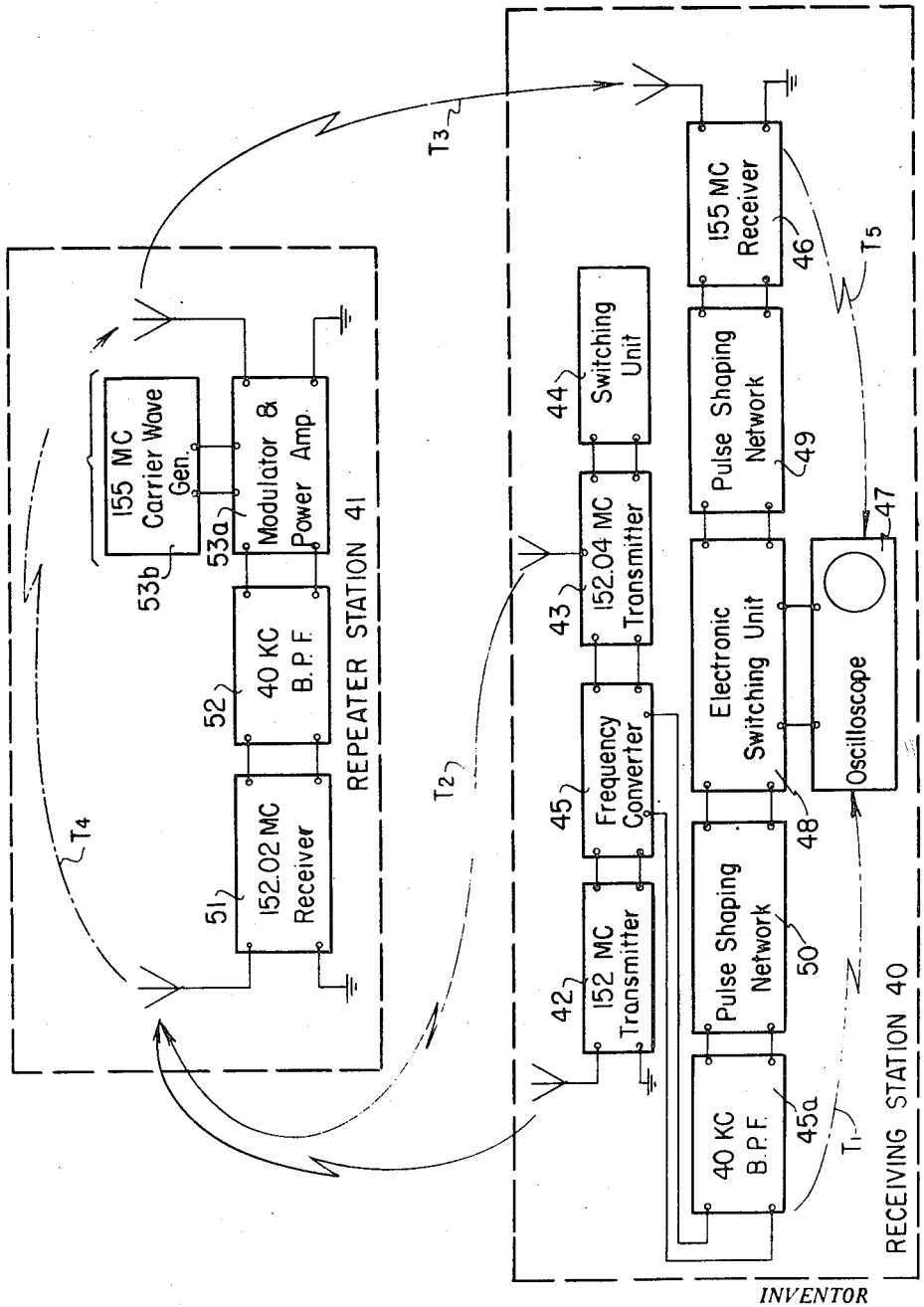

Patented July 4, 1950

2,513,322

UNITED STATES PATENT OFFICE 2,513,322

RADIO LOCATION SYSTEM

James E. Hawkins, Tulsa, Okla., assignor to Seismograph Service Corporation, Tulsa, Okla., a corporation of Delaware Application November 27, 1948, Serial No. 62,368

19 Claims. (Cl. 343—103)

The present invention relates to improvements in position finding or distance determining systems and more particularly to improved systems of this character in which pulsed signals are used and pulse propagation or transit time is the factor from which the position or distance information is derived.

Pulsed signal radio position finding systems of the type employing two or more transmitters radiating pulsed signals at a plurality of separated points, such, for example, as Loran, generally require synchronized pulse transmission from the spaced transmitters. The problem of maintaining pulse synchronism is difficult to solve and all known solutions either require continuous operator attendance of each transmitter or very elaborate synchronizing equipment which is costly to install and maintain.

It is an object of the present invention, therefore, to provide a system of the character described which requires no synchronization of the pulsed signals radiated from two or more spaced transmitting points.

It is another object of the invention to provide an improved pulse transit time system of position determination.

It is a further object of the invention to provide an improved pulse transit time system of distance determination.

According to another object of the invention, improved and exceedingly simple receiving apparatus is provided for use in pulse transit time position finding systems.

In accordance with a still further object of the invention, an improved and an exceedingly simple transmission system is provided for use in pulse transit time position finding systems.

The invention, both as to its organization and method of operation, together with further objects and advantages thereof, will best be understood by reference to the specification taken in connection with the accompanying drawings, in which:

Fig. 1 diagrammatically illustrates an improved radio position determining system characterized by the features of the present invention;

Fig. 2 is a time-signal pulse graph which is illustrated to facilitate explanation of the mode of operation of the system;

Fig. 3 is an end perspective view of the electron beam tube provided at the illustrated receiving station to indicate pulse transit time difference intervals;

Fig. 4 illustrates in more detail the arrangement of certain components of the receiving unit embodied in the system shown in Fig. 1;

Fig. 5 illustrates the time relationship between the occurrence of certain operations when the system shown in Fig. 1 is operated in a particular manner; and Fig. 6 illustrates a pulse transit time ranging system characterized by certain features of the present invention.

Figure 1:
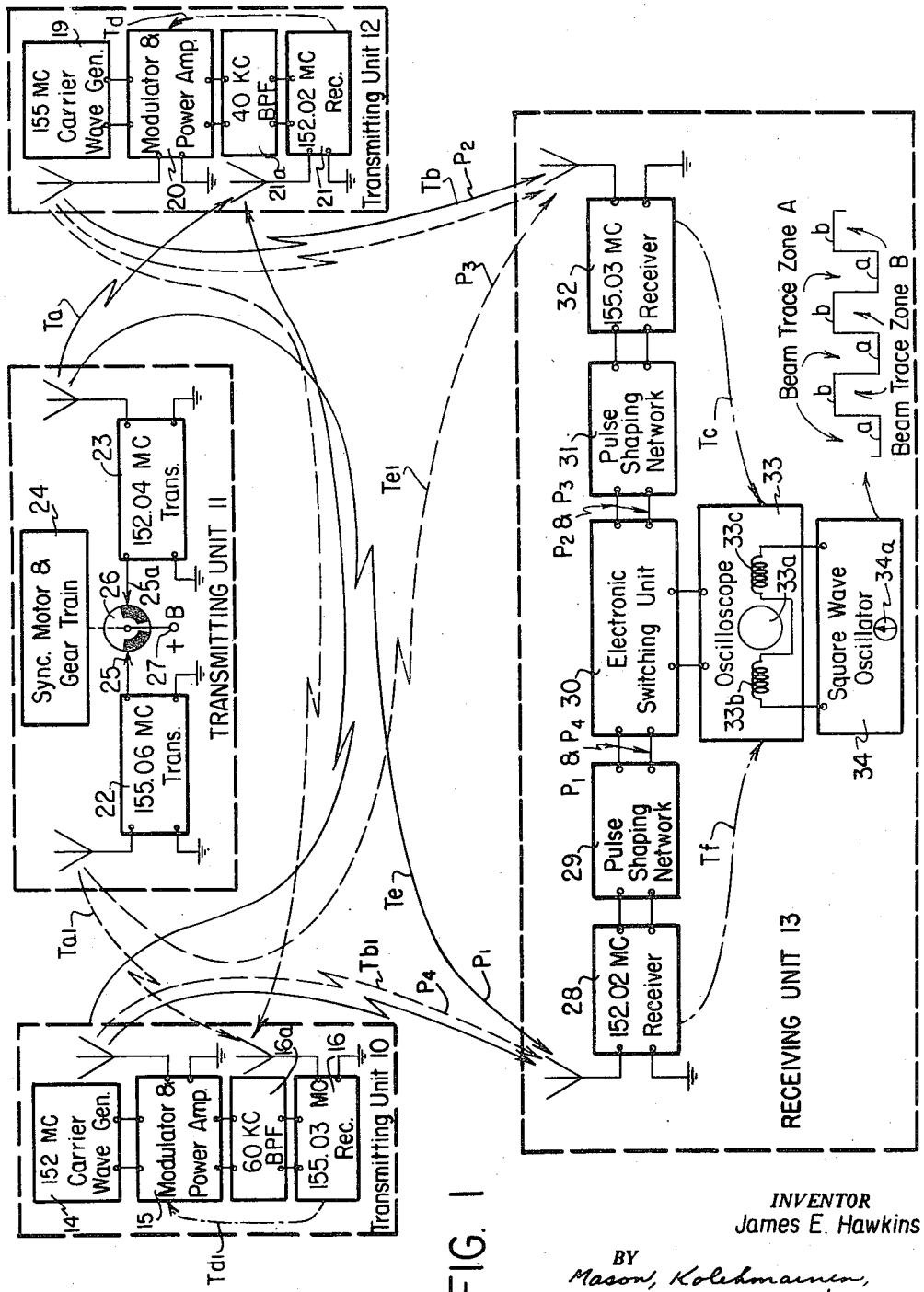

Referring now to the drawings and more particularly to Fig. 1 thereof, the present invention is there illustrated in its embodiment in a system for providing position information at a mobile receiving unit 13 which may be carried by a vessel or vehicle operating within the radius of transmission of three spaced transmitting units 10, 11 and 12. These units are preferably spaced apart approximately equal distances and are so positioned that the line bisecting the radiation points of the units 10 and 11 is angularly related to the line bisecting the radiation points of the units 11 and 12. As described more fully below, the transmitting units 10 and 12 are equipped continuously to radiate signals in the form of carrier waves of different frequencies, whereas the transmitting unit 11 is equipped alternately to radiate two pulsed carrier waves of still different frequencies. Specifically, the transmitter embodied in the unit 10 comprises a carrier wave generator or oscillator 14 and a modulator and power amplifier unit 15. Similarly, the transmitter embodied in the transmitting unit 12 comprises a carrier wave oscillator or generator 19 and a modulator and power amplifier unit 20. The transmitting unit 11 comprises two transmitters 22 and 23 for respectively radiating pulsed signals at two different carrier frequencies, together with switching means for alternately keying these two transmitters operative to generate the signal pulses. In the arrangement illustrated, periodic keying of the two transmitters 22 and 23 for alternate operation is accomplished by alternately feeding anode current to the electron discharge tubes of the respective transmitters from the positive terminal 27 of the anode current source, not shown, through a commutating ring 26 which is shaft connected to be driven at a constant speed by a synchronous motor and gear train unit 24. More specifically, the positive terminal 27 of the anode current source is connected to the conductive segment of the commutating ring 26, which segment spans less than half the circumference of the ring. The arc spanned by this conductive segment obviously determines the length or duration of each radiated signal pulse and may be selected in conformance with the desired pulse length. The remainder of the ring is comprised of an insulating segment. At diametrically opposed points around the circumference of the ring, brushes 25 and 25a are provided which engage the ring periphery. These brushes are respectively connected to the positive bus conductors of the two transmitters 22 and 23, such that anode current is alternately delivered to the electron discharge tubes of the two transmitters. Since the conductive segment of the ring 26 represents less than half the peripheral surface of the ring, it will be understood that an off-signal period is provided between successive pulse periods during which the transmitters 22 and 23 are alternatively operated, thus preventing simultaneous radiation of waves by both transmitters. The periodicity with which the two transmitters 22 and 23 are alternately operated is, of course, dependent upon the speed of rotation of the commutating ring 26. Preferably, this ring is driven at a speed of thirty revolutions per second such that the transmitters 22 and 23 are alternately rendered operative and each generate pulsed signals at the rate of thirty pulses per second.

While the transmitting unit 11 has been illustrated as comprising two transmitters 22 and 23, it will be understood that if desired a single transmitter may be employed which is equipped with two carrier wave frequency determining elements, preferably crystals, having different resonant frequencies. In such case, the anodes of the tubes embodied in the transmitters may be continuously supplied with operating potentials in the usual manner, and the switching device comprising the commutating ring 26 may be employed alternately to connect the two frequency determining elements into the transmitter circuit to control the output frequency of the transmitter. This arrangement has the advantage of minimizing duplication of equipment. It will also be understood that any desired switching arrangement, electronic or otherwise, having the required stability of pulse repetition rate, may be employed in lieu of that described for the purpose of rendering the transmitting unit alternately operative to transmit signal pulses of two different frequencies.

As indicated above, the carrier frequencies at which the four transmitters of the three transmitting units 10, 11 and 12 operate are all different. Preferably, however, these carrier waves are so paired that the frequencies of each pair occupy a minimum of space in the frequency spectrum. To this end, the output frequency of the transmitter 22 and the output frequency of the transmitter in the unit 12, forming the first transmitter pair, may be 155.06 and 155 megacycles respectively, such that the difference frequency therebetween is 60 kilocycles, while the output frequencies of the transmitter 23 and the transmitter of the unit 10, forming the second transmitter pair, may be 152.04 and 152 megacycles, respectively, such that the difference frequency therebetween is 40 kilocycles. It will be noted that the channels in which the two pairs of carrier frequencies fall are separated in the frequency spectrum by approximately 3 megacycles, thus facilitating selective reception of these carrier pairs in the manner more fully explained below. The power of the four transmitters is such that the entire area in which position information may be desired aboard the vehicle or vessel carrying the receiving unit 13 is blanketed with waves radiated from each of the four transmitters and that these waves have a field strength at all points within this area sufficient to permit reliable reception without requiring undue sensitivity of the receiving equipment.

In order to obviate the above-mentioned difficulties attendant with synchronization of the signal pulses radiated by the transmitters, while at the same time eliminating the necessity for utilizing additional frequency channels, means are provided in the transmitting units 10 and 12 for alternately modulating the waves radiated by the transmitters of the units 10 and 12 with pulsed reference signals representative of the difference frequencies between the carrier wave pairs. These reference signals may be received at any receiving point, such for example, as at the mobile receiving unit 13, located within the radius of transmission of the four transmitters. The equipment for this purpose as provided at the transmitting unit 10 comprises a fixed tuned amplitude modulation receiver 16, center tuned to a frequency of 155.03 megacycles and having a response band broad enough to admit the 155.06 and 155 megacycle signals respectively radiated by the transmitter 22 and the transmitter of the unit 12. The selectivity of this receiver is obviously such that the carrier waves radiated by the transmitter 23 and the transmitter of the unit 10 are rejected in the radio frequency section thereof. The beat frequency of 60 kilocycles between the two carriers accepted by the radio frequency section of the receiver 16 is reproduced in the low frequency section of this receiver and delivered to the modulator 15 through a 60 kilocycle band pass filter 16a for amplitude modulation upon the carrier output of the transmitter embodied in the unit 10. Similarly, the transmitting unit 12 is equipped with a fixed tuned amplitude modulation receiver 21 which is center tuned to a carrier frequency of 152.02 megacycles and has a response band broad enough to admit the 152.04 and 152 megacycle signals respectively radiated by the transmitter 23 and the transmitter of the unit 10. Here again, the selectivity of the receiver 21 is obviously such that the carrier waves radiated by the transmitter 22 and the transmitter of the unit 12 are rejected in the radio frequency section of the receiver. The beat frequency signal of 40 kilocycles between the two signals accepted by the receiver 21 is reproduced in the low frequency section thereof and transmitted through a sharply tuned 40 kilocycle band pass filter 21a for modulation upon the carrier wave output of the transmitter embodied in the transmitting unit 12.

Referring now more particularly to the equipment making up the receiving unit 13 at the mobile receiving station, it is pointed out that this equipment comprises a pair of fixed tuned amplitude modulation receivers 28 and 32 the output circuits of which are respectively connected through pulse shaping networks 29 and 31 to the respective sets of input terminals of an electronic switching unit 30 having the function of feeding signal energy alternately derived from the receivers 28 and 32 to the input terminals of an oscilloscope 33. Horizontal deflection control of the electron beam in the cathode ray tube 33a of the oscilloscope 33 is in part obtained externally by means of serially connected magnetic deflection coils 33b and 33c disposed upon opposite sides of the tube in the manner illustrated and described in "Measurements in Radio Engineering" by Terman, published by McGraw- Hill Book Company in 1935 at page 310, Fig. 163. These coils are arranged for excitation by a square wave oscillator 34 which is adjustable as to frequency by means of a frequency control element 34a. More specifically, the receiver 28 is fixed tuned to a carrier frequency of 152.02 megacycles and is designed to accept the pulsed signal radiated by the transmitter 23 and the carrier wave continuously radiated by the transmitter of the unit 10 both when the latter is modulated and unmodulated. Similarly, the receiver 32 is fixed tuned to a carrier frequency of 155.03 megacycles and is designed to accept the pulsed signal radiated by the transmitter 22 and the carrier wave continuously radiated by the transmitter of the unit 12 both when the latter is modulated and unmodulated. The signal pulses developed at the output terminals of the receiver 28 are shaped to accentuate the pulse build-up of each pulse and sharpen the pulses in the pulse shaping network 29 and delivered to the terminals of the oscilloscope 33 through the electronic switching unit 30. Similarly, the signal pulses developed across the output terminals of the receiver 32 are shaped to accentuate the pulse build-up of each pulse and sharpen the pulses in the pulse shaping network 31 and are delivered to the input terminals of the oscilloscope 33 through the electronic switching unit 30. Preferably, the pulse shaping networks 29 and 31 are of the character disclosed in Fig. 13.18a, page 501 in "Radar System Engineering" by Ridenour, published by the McGraw-Hill Book Company. As indicated above, the electronic switching unit 30 performs the function of alternately delivering signal pulse energy developed at the output terminals of the networks 29 and 31 to the oscilloscope 33 and preferably is of the commercial type YE-9, manufactured by the General Electric Company of Schenectady, New York. The oscilloscope 33 is preferably of the commercial type 256-D, manufactured by Allen B. Dumont Laboratories, Inc., of Passaic, New Jersey. The square wave oscillator 34 may be of any suitable commercial type capable of frequency adjustment.

In considering the operation of the above-described position determining system, it will be understood that when the motor and gear train unit 24 is operating to drive the commutating ring 26, anode current is alternately delivered to the electron discharge tubes of the transmitters 22 and 23, such that these transmitters are alternately rendered operative to radiate carrier waves at frequencies of 155.06 and 152.04 megacycles, respectively. The transmitters of the units 10 and 12, on the other hand, operate continuously. Accordingly, during each interval when the transmitter 23 is in operation, the carrier waves of 152.04 and 152 megacycles respectively radiated by the transmitter 23 and the transmitter of the unit 10 are picked up and heterodyned in the radio frequency sections of the receivers 21 and 28. In the receiver 21, the difference frequency signal pulse of 40 kilocycles is reproduced in the low frequency section of the receiver, passed by the filter 21a and modulated upon the carrier wave output of the transmitter in the unit 12 for radiation as a reference signal pulse. If desired an amplifier and automatic gain control unit, not shown, may also be interposed between the output terminals of the receiver 21 and the modulator 20 in order to maintain constant modulation. The signal pulse modulated carrier wave radiated by the unit 12 is received by the receiver 32 of the mobile receiving unit 13 and the 40 kilocycle signal pulse is reproduced at the output terminals of this receiver. During the period indicated, the transmitter 22 is not in operation and hence no heterodyne or beat frequency signal pulse is developed by the receiver 32. The 40 kilocycle reference signal pulse as thus reproduced by the receiver 32 is applied to the input terminals of the pulse shaping network 31.

The 40 kilocycle beat frequency or heterodyne signal pulse resulting from heterodyning of the pulsed carrier radiated by the transmitter 23 with the continuous carrier radiated by the transmitter of the unit 10 in the radio frequency section of the receiver 28 is reproduced across the output terminals of this receiver and applied to the input terminals of the pulse shaping network 29.

At the end of the described transmitting interval, the commutating ring 26 functions to interrupt the circuit for delivering anode current to the tubes of the transmitter 23, with the result that the pulse radiated by this transmitter is terminated. When signal transmission from this transmitter stops, the carrier heterodyning action of the two receivers 21 and 28 is likewise terminated to interrupt the reference signal pulse radiated by the transmitter of the unit 12 and to interrupt the heterodyne or difference frequency signal pulse being developed across the output terminals of the receiver 28.

A short time interval after operation of the transmitter 23 is stopped, the commutating ring 26 functions to deliver anode current to the tubes of the transmitter 22 and thus initiate operation of this transmitter. With the transmitter 22 in operation, a 155.06 megacycle signal pulse is radiated thereby which is accepted by the receivers 16 and 32. More specifically, the receiver 16 functions to heterodyne the pulsed carrier wave radiated by the transmitter 22 with the 155 megacycle carrier wave continuously radiated by the transmitter of the unit 12 and to reproduce the heterodyne or difference frequency signal of 60 kilocycles in the low frequency section thereof. This difference frequency or reference signal pulse is passed by the filter 16a and modulated upon the output carrier wave of the generator 14 in the modulator and power amplifier unit 15 and radiated as a modulation component upon the carrier wave transmitted by the transmitter of the unit 10 to the receiver 28. As previously mentioned in connection with the receiver 21 of the unit 12, a suitable amplifier and automatic gain control stage may be interposed between the output terminals of the receiver 16 and the modulator 15 in order to maintain constant modulation. The receiver 28 accepts the signal pulse modulated carrier wave and reproduces the modulation component thereof in the usual manner. The reference signal pulse thus developed across the output terminals of the receiver 28 is applied across the input terminals of the pulse shaping network 29. It will be understood that the receiver 28 is incapable of accepting the carrier waves radiated by the transmitter 22 and the transmitter of the unit 12. Hence this receiver is prevented from heterodyning the carrier waves radiated by either of these two transmitters with the carrier wave radiated by the transmitter of the unit 10.

The 155.06 and 155 megacycle waves respectively radiated by the transmitter 22 and the transmitter of the unit 12 are both accepted by the receiver 32 and heterodyned in the radio frequency section thereof to produce a 60 kilocycle heterodyne or difference frequency signal pulse which is reproduced across the output terminals of the receiver and applied to the input terminals of the pulse shaping network 31.

At the end of the described signal pulse interval, the commutating ring 26 functions to interrupt anode current flow to the tubes of the transmitter 22 and thus arrest operation of this transmitter. When carrier wave radiation by the transmitter 22 is thus terminated, the wave heterodyning action effected in the receivers 16 and 32 is instantly stopped to terminate radiation of the 60 kilocycle reference signal pulse by the transmitter of the unit 10 and to terminate reproduction of the difference or heterodyne signal pulse at the output terminals of the receiver 32. A short time interval after operation of the transmitter 22 is arrested, the commutating ring 26 functions to recomplete the circuit for delivering anode current to the tubes of the transmitter 23 and thus reinitiate operation of this transmitter with the results described above.

From the foregoing explanation, it will be understood that the transmitters 22 and 23, in their alternate operation to radiate pulsed carrier waves, cooperate with the receivers 16 and 21 of the transmitting units 12 and 10 alternately to render the transmitters of these latter units inoperative to radiate position indicating signals and reference signal pulses. More in particular, the pulsed position indicating carrier waves alternately radiated by the transmitters 22 and 23 alternately cause the position indicating carrier waves respectively radiated by the transmitters of the units 10 and 12 to be modulated with reference signal pulses during periods when these latter transmitters are respectively inactive as position indicating signal radiators. At the receiving station, each of the receivers 28 and 32 alternately functions to detect and develop reference signal pulses and position indicating signal pulses which are applied to the input sides of the pulse shaping networks 29 and 31.

In order to illustrate the action which occurs, arrow pointed solid lines have been shown in Fig. 1 of the drawings to indicate the receiving points of signal acceptance and the sources of the accepted signals during each pulse period when the transmitter 23 is operating, arrow pointed dashed lines have been shown to illustrate the receiving points of signal acceptance and the sources of accepted signals during each pulse period when the transmitter 22 is operating, and arrow pointed dot and dash lines have been illustrated to show signal pulse travel through the translating channels of the units 10, 12 and 13. Certain of these lines have been suitably labeled with distinguishable pulse identification and pulse transit time designations for the purpose of more clearly describing the mode of operation of the pulse transit time comparison means provided in the mobile receiving unit or station 13. From a consideration of these lines and reflection upon the above explanation, it will be understood that the receivers 28 and 32 alternately function as reference signal pulse detecting receivers and as heterodyning receivers for developing the required heterodyne or difference frequency signal pulses. Specifically, the receiver 28 functions as a heterodyning receiver in respect to the position indicating carrier waves radiated by the transmitter 23 and the transmitter of the unit 10, and functions as a reference signal pulse reproducing receiver in that it receives and reproduces the reference signal pulse modulated carrier radiated by the transmitter of the unit 10. The receiver 32, on the other hand, functions as a heterodyne receiver in respect to the position indicating carrier waves radiated by the transmitter 22 and the transmitter of the unit 12 and as a reference signal pulse detecting receiver in receiving the reference signal pulse modulated carrier wave radiated by the transmitter of the unit 12.

At this point it is noted that the filters 16a and 21a are provided in the modulation paths of the transmitting units 10 and 12 to prevent interfering signals from being radiated by the transmitters of these two units. Thus with the transmitter 23 and the transmitter of the transmitting unit 10 operating, the output signal of the transmitting unit 12 consists of a 155 megacycle carrier wave modulated with a 40 kilocycle pulse. This signal is accepted by the receiver 16 and the 40 kilocycle modulation component is reproduced across the output terminals of the receiver. If the center tuned 60 kilocycle band pass filter 16a were not provided in the modulation path of the transmitting unit 10, the described 40 kilocycle signal pulse would be modulated upon the carrier radiated by the transmitting unit 10 and reproduced by the receiver 28 at the receiving station 13 to interfere with the 40 kilocycle heterodyne signal pulse being concurrently produced in the receiver 28 through direct heterodying of the carrier waves received from the transmitter 23 and the transmitter of the transmitting unit 10. However, by providing the filter 16a, the 40 kilocycle signal pulse reproduced by the receiver 16 is blocked from the modulator 15 and hence is not radiated by the transmitter of the transmitting unit 10. In a similar manner, the center tuned 40 kilocycle band pass filter 21a prevents spurious modulation of the carrier radiated by the transmitter of the transmitting unit 12 with a 60 kilocycle signal pulse during those pulse periods when the transmitter 22 is operating.

Referring now more particularly to the manner in which the described signal pulses are converted into position indications, it is pointed out that the oscilloscope 33, the switching unit 30 and the two pulse shaping networks 29 and 31 comprise pulse transit time comparison means and perform the function of measuring the time differences between the signal pulses developed across the output terminals of the two receivers 28 and 32. In this regard it will be recalled that the transmitters in the units 10 and 12 are in continuous operation and alternately serve as heterodyning signal sources for the pulsed signals originating at the transmitting unit 11. Thus the signal pulses all originate at the common transmitting unit 11. Each pulse is transmitted to the receiving unit 13 over two different routes. Thus each signal pulse radiated by the transmitter 23 is directly transmitted to the receiver 28 and is in transit between the transmitter 23 and the receiver 28 a variable time interval $T_e$ determined solely by the distance between the radiation point of the transmitting unit 11 and the signal collecting point of the receiving unit 13. Each pulse traverses the signal translating channel through the receiver 28, the pulse shaping network 29, the electronic switching unit 30 and the oscilloscope 33 in a pulse transit interval $T_r$. The same pulses are each transmitted to the receiver 21 in a pulse transit interval $T_a$, traverse the receiver translating channel and the modulation path of the transmitting unit 12 in the transit interval $T_d$ and are transmitted to the receiver 32 of the receiving unit 13 in the transit interval $T_b$. After reaching the signal collection point of the receiving unit 13, each pulse traverses the signal translating channel comprising the receiver 32, the pulse shaping network 31, the electronic switching unit 30 and the oscilloscope 33 in a pulse transit interval $T_c$. Preferably, the circuits are so designed that the pulse transit intervals $T_c$ and $T_f$ are equal. The pulse transit interval $T_a$ is constant and is determined by the length of the base line connecting the transmitting units 11 and 12. Each of the pulse transit intervals $T_c$, $T_d$ and $T_f$ is also a constant. The pulse transit interval $T_b$ is a variable determined by the distance between the signal radiating point of the transmitting unit 12 and the signal collection point of the receiving unit 13. Thus and as shown in Figs. 2 and 3 of the drawings, for any given signal pulse radiated by the transmitter 23, the pulse transit difference time $TD$, as measured by the oscilloscope 33, between the pulse as reproduced by the receiver 28 and later by the receiver 32 is as follows:

$$TD = T_a + T_b + T_c + T_d - T_e - T_f \quad (1)$$

Assuming that $T_c = T_f$;

$$TD = T_a + T_d + T_b - T_e \quad (2)$$

However $T_a + T_d = K =$ a constant time interval.

Therefore, $$TD = T_b - T_e + K \quad (3)$$

It can be shown that Equation 3 above is the equation of a hyperbola. Hence, it will be understood that the locus of all points representative of a given constant pulse transit time difference interval is a hyperbola having the radiation points of the transmitter 23 and the transmitter of the unit 12 as foci, and that spaced apart hyperbolic lines all having the radiation points of these transmitters as foci are representative of different constant pulse transit time difference intervals.

In a similar manner, each signal pulse radiated by the transmitter 22 is directly transmitted to the receiver 32 and is in transit between the transmitter 22 and the receiver 32 a variable time interval $T_{e1}$ determined solely by the distance between the radiation point of the transmitting unit 11 and the signal collecting point of the receiving unit 13. The same pulses are each transmitted to the receiver 16 in a pulse transit interval $T_{a1}$, traverse the receiver translating channel and the modulation path of the transmitting unit 10 in the transit interval $T_{d1}$ and are transmitted to the receiving unit 13 in the transit interval $T_{b1}$. The pulse transit interval $T_{a1}$ is constant and is determined by the length of the base line connecting the transmitting units 10 and 11. The pulse transit interval $T_{d1}$ is also a constant. The pulse transit interval $T_{b1}$ is a variable determined by the distance between the signal radiation point of the transmitting unit 10 and the signal collection point of the receiving unit 13. Thus in considering any given signal pulse radiated by the transmitter 22, the pulse transit difference time $TD_1$, as measured by the oscilloscope 33, between the pulse as reproduced by the receiver 32 and later by the receiver 28 may be represented by the equation:

$$TD_1 = T_{a1} + T_{d1} + T_{b1} + T_f - T_{e1} - T_c \quad (4)$$

However, $T_f$ and $T_c$ are assumed to be equal and $T_{a1} + T_{d1} = K_1 =$ a constant time interval. Therefore, $$TD_1 = T_{b1} - T_{e1} + K_1 \quad (5)$$

It can be shown that Equation 5 above is the equation of a hyperbola. It will be understood, therefore, that the locus of all points representative of a given constant pulse transit difference interval between the transit times required for the pulse originating at the transmitter 22 to reach the receiving unit 13 over the two paths is a hyperbola having the radiation points of the transmitter 22 and the transmitter of the unit 10 as foci, and further that spaced apart hyperbolic lines all having the radiation points of these two transmitters as foci are representative of different constant pulse transit time difference intervals.

Referring now more particularly to the manner in which the electronic switching unit 30 and the square wave oscillator 34 control visual reproduction of the signal pulses by the cathode ray tube 33a of the oscilloscope 33, it is pointed out above that the switching unit 30 alternately derives signal pulse energy from the two pulse shaping networks 29 and 31 and delivers this energy to the vertical deflection electrodes of the tube 33a through the signal channel of the oscilloscope. Further by suitable adjustment of the balance control means provided in the switching unit 30, vertical separation of the visually reproduced signal pulses is effected in the manner illustrated in Fig. 3 of the drawings. Hence, when two signal pulses are received from the two pulse shaping networks 29 and 31 during a horizontal trace period of the oscilloscope, they are reproduced one above the other on the screen of the cathode ray tube 33a. The frequency of switching of the electronic switching unit 30 is extremely high in comparison with the sweep repetition rate of the oscilloscope 33, being preferably of the order of $10^6$ switching cycles per second. The sweep repetition rate of the oscilloscope 33 is adjusted to a value exactly twice the rate of switching of the transmitters 22 and 23 in the transmitting unit 11, i. e., 60 sweep cycles per second.

During operation of the equipment, the square wave oscillator 34 functions to restrict the length of the beam trace paths horizontally of the cathode ray screen alternately to the zones A and B as shown in Fig. 3 of the drawings, such that the pulses $P_1$ and $P_2$ received at the receiving unit 13 over the two different paths from the transmitting unit 11 when the transmitter 23 is operating are reproduced in the beam trace zone A to the left of the cathode ray tube screen, whereas the pulses $P_3$ and $P_4$ received at the receiving unit 13 over the two different paths from the transmitting unit 11 when the transmitter 22 is operating are reproduced in the beam trace zone B. More specifically, and as indicated in Fig. 1 of the drawings, during each alternate half cycle $a$ of the signal voltage impressed upon the deflecting coils 33b and 33c by the square wave oscillator 34, the horizontal beam path of the tube 33a is confined to the zone A. During the intervening half cycles $b$ of the signal voltage impressed upon the deflecting coils 33b and 33c by the oscillator 34, horizontal deflection of the cathode ray relative to the screen of the tube is confined to the beam trace zone B. By suitable adjustment of the frequency adjusting element 34a of the oscillator 34, the output frequency of this oscillator is adjusted precisely to equal the frequency at which the transmitters 22 and 23 are switched at the transmitting unit 11, i. e., to a value of 30 cycles per second.

From the above explanation and reference to Fig. 3 of the drawings, it will be understood that during each period when the transmitter 23 is operating to cause development of the pulses $P_1$ and $P_2$ across the output terminals of the pulse shaping networks 29 and 31, respectively, horizontal deflection of the cathode ray beam in the tube 33a is confined to the zone A. As the two pulses $P_1$ and $P_2$ are developed at the output sides of the networks 29 and 31, the electronic switching unit, which is operating at an extremely high switching frequency, causes successive small increments of each pulse to be reproduced visually on the screen of the tube 33a within the beam trace zone A. Moreover, due to the unbalanced setting of the balance control means embodied in the switching unit 30, the reproduced increments of the signal pulses are displaced vertically on the screen. Thus, during each horizontal sweep of the cathode ray beam at least the first portions of the two pulses $P_1$ and $P_2$ are reproduced on the screen within the zone A thereof.

After the pulses $P_1$ and $P_2$ are reproduced, the square wave oscillator 34 operating in conjunction with the deflection coils 33b and 33c deflects the beam of the tube 33a to confine horizontal deflection thereof to the zone B. During the interval when the cathode ray beam is confined to the zone B, the transmitter 22 operates in the manner explained above to cause development of the pulses $P_3$ and $P_4$ across the output terminals of the pulse shaping networks 31 and 29, respectively. Here again, the rapid switching of the oscilloscope input terminals between the output sides of the two networks 29 and 31 causes reproduction of the pulses $P_3$ and $P_4$ in small increments. However, over the elapsed time of the horizontal beam sweep in progress, at least the starting portions of both pulses are reproduced on the screen within the zone B thereof. Since each of the pulses $P_1$, $P_2$, $P_3$ and $P_4$ is developed at the transmitting unit 11 at the rate of 30 pulses per second, it will be understood that each pulse is reproduced on the screen of the cathode ray tube 33a at the same rate. Due to the persistence of vision of the human eye, and the persistence of the fluorescent screen of the tube 33a, the four signal pulses continuously persist on the screen in the four different positions described.

An alternative method of controlling the oscilloscope 33 to produce the pulses $P_1$, $P_2$, $P_3$ and $P_4$ in the four zones of the oscilloscope screen shown in Fig. 3, which does not require the described high speed operation of the electronic switching unit 30, may be explained with reference to Figs. 4 and 5 of the drawings. In Fig. 4, the vertical and horizontal deflecting electrodes 33v and 33h of the oscilloscope tube 33a and the saw-tooth oscillator 33d which controls horizontal sweeping of the cathode ray beam in the tube 33a have been illustrated. In Fig. 5, the required time relationships between the switching of the transmitters 22 and 23, curve 36, switching of the oscilloscope beam between the zones A and B of the tube screen under the control of the square wave oscillator, curve 38, switching of the oscilloscope beam between the upper and lower trace positions illustrated in Fig. 3 under the control of the electronic switching unit 30, curve 37, and horizontal deflection of the oscilloscope beam under the control of the saw-tooth wave 39 developed by the oscillator 33d, have all been illustrated. From an examination of these curves, it will be observed that the square wave oscillator 34 is adjusted to operate at the switching frequency of the transmitters 22 and 23, i. e., at a frequency of thirty cycles per second, and that the saw-tooth oscillator 33d is adjusted to operate at exactly twice this frequency. The electronic switching unit 30, on the other hand, is adjusted to operate at half the transmitter switching frequency, i. e., at a frequency of fifteen cycles per second. The phase relationships illustrated in Fig. 5 of the drawings are obtained by synchronizing the triggering of the switching unit 30 and the oscillators 33d and 34 with the operation of the synchronous motor and gear train unit 24. This may be accomplished in a well known manner by employing a small portion of the received signal energy as a triggering voltage for the named components.

From an examination of the curves shown in Fig. 5, it will be noted that during each of the time intervals $a$—$b$, $e$—$f$, $i$—$j$, $m$—$n$, etc., curve 36, the transmitter 23 is operating with the result that the pulses $P_1$ and $P_2$ are applied to the left and right sets of input terminals, respectively, of the electronic switching unit 30. During each of the intervening intervals $c$—$d$, $g$—$h$, $k$—$l$, $o$—$p$, etc., curve 36, the transmitter 22 is operating such that the pulses $P_3$ and $P_4$ are applied to the right and left sets of input terminals, respectively, of the switching unit 30. Further and as explained above, the function of the electronic switching unit is two-fold. First, this unit functions as a beam deflecting unit to make the beam trace path occupy the upper and lower positions on the screen of the tube 33a shown in Fig. 3 of the drawings. Secondly, this unit functions as a gating amplifier alternately to deliver signal energy to the vertical deflection electrodes 33v of the tube 33a from its left and right sets of input terminals. By virtue of the latter function, only the signal pulses $P_1$ and $P_4$ may be transmitted from the left set of input terminals of the switching unit 30 to the vertical deflection electrodes 33v during each of the intervals $a$—$d$ and $i$—$l$, curve 37. For the same reason, only the pulses $P_2$ and $P_3$ may be transmitted from the right set of input terminals of the switching unit 30 to the vertical deflection electrodes 33v of the tube 33a during the intervals $e$—$h$ and $m$—$p$, curve 37. From reexamination of the curves of Fig. 5 it will be evident that the pulse $P_1$ appears on the oscilloscope screen, Fig. 3, during the first half $a$—$b$ of the interval $a$—$d$ and that the pulse $P_4$ occurs during the last half $c$—$d$ of the interval $a$—$d$. Similarly, the pulse $P_2$ occurs during the first half $e$—$f$ of the interval $e$—$h$ and the pulse $P_3$ occurs during the second half $g$—$h$ of the interval $e$—$h$. The described sequence of pulse occurrence is repeated during succeeding switching cycles of the electronic switching unit 30.

From the above explanation, it will be understood that in order to reproduce the pulses on the screen of the tube 33a in the relative positions shown in Fig. 3 of the drawings all that remains to be done is the operation of shifting the beam trace path of the cathode ray beam from zone A to the zone B at each of the instants $b$, $d$, $f$, $h$, etc. This is accomplished under the control of the square wave oscillator 34 in the manner previously explained. Thus the pulses $P_1$, $P_4$, $P_2$ and $P_3$ are reproduced successively on the screen of the tube 33a in the order named and in the relative positions illustrated in Fig. 3 of the drawings during each pair of switching cycles of the transmitters 22 and 23. Since as explained above, these pulses are each produced at the rate of sixty pulses per second, they continuously persist on the screen.

From an examination of curve 39, which is not drawn to scale, it will be noted that the sawtooth oscillator 33d is designed to have a delayed sweep followed by a fast expanding sweep. The fast sweep begins coincident with each of the switching points of the square waves 36 and 38 and persists for an interval sufficiently long to provide the required accuracy of pulse reproduction.

From an examination of Fig. 3 of the drawings, it will be seen that the time delay TD between the pulses $P_1$ transmitted directly from the transmitter 23 of the transmitting unit 11 to the receiving unit 13 over the path $T_e$ and the pulses $P_2$ transmitted from the transmitter 23 to the receiving unit 13 by way of the transmitting unit 12 is accurately indicated by the horizontal displacement D between the starting points of the pulses $P_1$ and $P_2$. Similarly, the time delay $TD_1$ between the pulses $P_3$ transmitted directly to the receiving unit 13 from the transmitter 22 over the path $T_{e1}$ and the pulses $P_4$ transmitted to the receiving unit 13 from the transmitter 22 by way of the transmitting unit 10 is accurately indicated by the horizontal displacement $D_1$ between the starting points of the pulses $P_3$ and $P_4$. At this point it is noted that since the pulses $P_3$ are received directly at the receiver 32 of the receiving unit 13 from the transmitter 22 of the transmitting unit 11, they are reproduced beneath the pulses $P_4$ which are received at the receiving unit 13 indirectly from the transmitter 22 by way of the transmitting unit 10. By proper interpretation of the measured delay interval TD and $TD_1$, through the use of hyperbolic coordinate charts having intersecting hyperbolic lines representative of constant pulse transit time difference intervals and having the known radiation points of the transmitting units 10, 11 and 12 as foci, the exact geographic location of the receiving unit 13 may easily be determined.

Referring again to the pulses produced by the transmitter 23, it will be understood that reception and reproduction of each pulse $P_1$ by the receiver 28 and pulse shaping network 29 is started before reception and reproduction of the corresponding pulse $P_2$ by the receiver 32 and pulse shaping network 31 so long as the pulse transit interval $T_e$ does not exceed the total time of the pulse transit time intervals $T_a$, $T_d$, and $T_b$. However, in certain locations of the receiving unit 13 relative to the radiation points of the transmitting units 10, 11 and 12, the pulse transit interval $T_e$ may be greater than the total time of the pulse transit intervals $T_a$, $T_b$, and $T_d$. In such case, the starting points of the pulses $P_2$ are to the left of the starting points of the pulses $P_1$ within the zone A of the cathode ray tube screen. However, the relative vertical positions of the reproduced pulses $P_1$ and $P_2$ remain the same. Obviously, if the pulses originating at the transmitter 23 require exactly the same amount of time to reach the receiving unit 13 over the two different paths, the starting points of the pulses $P_1$ and $P_2$ are reproduced one above the other in exact vertical alignment. The same is true of the relative horizontal positions of the starting points of the reproduced pulses $P_3$ and $P_4$. Thus the system arrangement is such that positive identification of the paths over which the pulses are transmitted to the receiving unit 13 is assured.

Referring now more particularly to Fig. 6 of the drawings, certain features of the present invention are there illustrated in their embodiment in a range or distance determining system of the pulse transit time type. In brief, the system comprises a receiving station 40 and a repeating station 41, either of which may be fixed and the other mobile depending upon the particular use to which the system is to be put. The station 40 comprises a transmitter 42 which operates continuously to radiate a pure carrier wave at a frequency of 152 megacycles, for example, and a second transmitter 43 which is periodically pulsed by means of a switching unit 44 to radiate carrier frequency pulses at a frequency of 152.04 megacycles, for example. It will be understood that the switching unit 44 may be of the electronic type or of the electromechanical type illustrated in Fig. 1 of the drawings. Preferably, this unit is operative to key the carrier output of the transmitter 43 at a rate of approximately thirty pulses per second. The signal continuously radiated by the transmitter 42 and the pulsed signal radiated by the transmitter 43 are transmitted to the repeating station 41 to develop a pulsed reference signal which is transmitted back to the receiving station 40 and reproduced by a receiver 46. Portions of the signal energy developed by the two transmitters 42 and 43 are also heterodyned in a frequency converter 45 locally at the receiving unit 40 to develop a beat or difference frequency signal which is selectively passed by a band pass filter 45a. This pulsed signal is transmitted through a pulse shaping network 50 and an electronic switching unit 48 to an oscilloscope 47. Similarly, the signal pulses reproduced by the receiver 46 are transmitted through a pulse shaping network 49 and the electronic switching unit 48 to the oscilloscope 47. The pulse shaping networks 49 and 50, the switching unit 48 and the oscilloscope 47 may be identical with the corresponding components of the mobile receiving unit 13 illustrated in Fig. 1 of the drawings.

As shown, the repeating station 41 comprises a receiver 51 center tuned to a frequency of 152.02 megacycles and having a response band broad enough to accept and heterodyne the signals radiated by the two transmitters 42 and 43. The beat or difference frequency signal pulses developed through heterodyning of the signals received from the transmitters 42 and 43 are selectively passed by a band pass filter 52 and modulated upon the carrier wave developed by a carrier wave generator 53b in the modulation and power amplifier stage 53a of a transmitter comprising the two last-named elements and generally indicated at 53. The pulse modulated signal thus developed by the transmitter 53 is transmitted back to the receiving station 40 where the signal pulses are detected and reproduced by the receiver 46.

As will be partially apparent from the above explanation, the distance determining operation of the system shown in Fig. 6 of the drawings is dependent upon the time difference between the pulses generated locally at the receiving unit 40 and the pulses transmitted from this unit to the repeater station 41 and then back to the receiving station 40. In more detail, with the transmitter 42 in continuous operation and the transmitter 43 operating on a periodic basis, 40 kilocycle beat frequency signal pulses are developed locally at the receiving station 40 across the output terminals of the frequency converter 45.

These pulses are selectively passed by the band pass filter 45a, shaped to accentuate the pulse build-up of each pulse and sharpened in the pulse shaping network 50, and are impressed upon the left set of input terminals of the electronic switching unit 48. Heterodyning of the pulsed signal radiated by the transmitter 42 with the continuous signal radiated by the transmitter 43 in the high frequency section of the receiver 51 also results in the production of 40 kilocycle beat frequency signal pulses across the output terminals of the receiver 51 which are selectively passed by the band pass filter 52 and modulated upon the carrier wave output of the transmitter 53 in the modulator and power amplifier stage 53a. The pulse modulated 155 megacycle carrier wave thus radiated by the transmitter 53 is received and demodulated by the receiver 46 so that the pulses are reproduced across the output terminals of this receiver. These pulses are shaped to accentuate the pulse build-up of each pulse and sharpened in the pulse shaping network 49 and are then impressed upon the right set of input terminals of the electronic switching unit 48. The electronic switching unit 48 controls the oscilloscope 47 to cause visual reproduction of the pulses developed at the output sides of the networks 50 and 49 in vertically displaced positions on the screen of the oscilloscope tube in the exact manner explained above with reference to Figs. 1 and 3 of the drawings. Thus the time difference between the pulses generated locally at the receiving station 40 and relayed to this station by way of the repeater station 41 is indicated by the horizontal displacement between the starting points of the upper and lower pulses visually produced on the screen of the oscilloscope tube.

The time interval required for a signal pulse generated by the transmitter 43 to travel from the station 40 to the repeater station 41 and return from the repeater station back to the receiving station 40 is a function of the distance between the stations 40 and 41. More specifically, the total pulse transit time interval T as measured in terms of horizontal displacement between the starting points of the upper and lower pulses reproduced on the screen of the oscilloscope tube is given by the equation:

$$T = T_2 + T_4 + T_3 + T_5 - T_1$$

where $T_2$ is the time interval required for a pulse to travel from the station 40 to the station 41, $T_4$ is the time interval required for the pulse to traverse the signal translating channel of the station 41, $T_3$ is the time interval required for the pulse to travel from the station 41 back to the station 40, $T_5$ is the time interval required for the pulse to traverse the signal translating channel through the components 46, 49, 48 and 47, and $T_1$ is the time interval required for a pulse to traverse the signal translating channel through the components 45, 45a, 50, 48 and 47. Each of the time intervals $T_1$, $T_4$ and $T_5$ is a constant. Hence $$T_4 + T_5 - T_1 = K_1$$

Further, at all points of equal distance between the two stations 40 and 41 the pulse transit times $T_2$ and $T_3$ are constant, such that $T_2 + T_3 = K_2$. Thus, $T = K_1 + K_2 = K$, which may be shown to be the equation of a circle. Hence, if a chart is employed having circles inscribed thereon to represent different values of $T_2 + T_3 + K_1$, the time difference intervals indicated through reproduction of the pulses by the oscilloscope 47 may readily be interpreted to indicate the distance between the two stations 40 and 41. It will be understood that if a position fix is required, two ranging systems of the character disclosed in Fig. 6 of the drawings must be employed.

From the foregoing explanation, it will be understood that in both the position finding system illustrated in Fig. 1 of the drawings and the range or distance determining system illustrated in Fig. 4 of the drawings, the problem of synchronizing pulses developed at two or more widely separated transmitting stations is completely obviated. Moreover, this is accomplished in a completely simple manner with a minimum of equipment all of which may be of standard construction.

While different embodiments of the invention have been described, it will be understood that various modifications may be made therein which are within the true spirit and scope of the invention as defined in the appended claims.

What is desired to be secured by United States Letters Patent is:

1. A pulse transit time radio location system, comprising a first transmitter for radiating a first signal of one frequency, a second transmitter for producing a pulsed signal of different frequency, a third transmitter for radiating a carrier signal at a third frequency, heterodyning means for heterodyning said first and pulsed signals to produce a pulsed reference signal having a frequency related to the beat frequency between said first and pulsed signals, modulating means for modulating said pulsed reference signal upon the carrier signal radiated by said third transmitter, and receiving apparatus including pulse transit time comparison means responsive to the pulsed signals produced by said second and third transmitters for producing an indication representative of the relative positions of said receiving station and at least one of said transmitters.

2. A pulse transit time radio location system, comprising receiving apparatus, transmitting means for transmitting pulses of high frequency signal energy to said receiving apparatus over two different paths the relative lengths of which determine the difference in pulse transit times over said paths, a transmitter for radiating another high frequency signal, receiving means included in one of said paths for heterodyning the pulses of high frequency signal energy with said other high frequency signal, and pulse transit time comparison means included in said receiving apparatus to measure the difference in pulse transit times over said two different paths.

3. A pulse transit time radio location system, comprising receiving apparatus, transmitting means for transmitting pulses of high frequency signal energy to said receiving apparatus over two different paths the relative lengths of which determine the difference in pulse transit times over said paths, a high frequency signal source, means included in one of said paths for heterodyning said pulses of high frequency signal energy with signal energy derived from said source to produce beat frequency signal pulses and for transmitting said beat frequency signal pulses to said receiving apparatus, means included in said receiving apparatus for heterodyning said pulses of high frequency energy with signal energy derived from said source to produce beat frequency signal pulses, and pulse transit time comparison means included in said receiving apparatus and excited by said beat frequency pulses to measure the difference in pulse transit times over said two different paths.

4. A pulse transit time radio location system, comprising receiving apparatus, transmitting means for transmitting pulses of high frequency signal energy to said receiving apparatus over two different paths the relative lengths of which determine the difference in pulse transit times over said paths, a high frequency signal source, a signal pulse repeating station disposed at a known location displaced from said transmitting means and receiving apparatus in one of said paths and including means for heterodyning said pulses of high frequency signal energy with signal energy derived from said source to produce beat frequency signal pulses and for transmitting said beat frequency signal pulses to said receiving apparatus, means included in said receiving apparatus for heterodyning said pulses of high frequency energy with signal energy derived from said source to produce beat frequency signal pulses, and pulse transit time comparison means included in said receiving apparatus and excited by said beat frequency pulses to measure the difference in pulse transit times over said two different paths.

5. A pulse transit time radio location system, comprising receiving apparatus, transmitting means located at a known position and operative to transmit pulses of high frequency signal energy to said receiving apparatus over two different paths the relative lengths of which determine the difference in pulse transit times over said paths, a high frequency signal source, a signal pulse repeating station disposed at a known location displaced from said transmitting means and receiving apparatus in one of said paths and including means for heterodyning said pulses of high frequency signal energy with signal energy derived from said source to produce beat frequency signal pulses and for transmitting said beat frequency signal pulses to said receiving apparatus, means included in said receiving apparatus for heterodyning said pulses of high frequency energy with signal energy derived from said source to produce beat frequency signal pulses, and pulse transit time comparison means included in said receiving apparatus and excited by said beat frequency pulses to measure the difference in pulse transit times over said two different paths.

6. A pulse transit time radio location system, comprising receiving apparatus, transmitting means located at a known position and operative to transmit pulses of high frequency signal energy to said receiving apparatus over two different paths the relative lengths of which determine the difference in pulse transit times over said paths, a high frequency signal source including means for continuously radiating high frequency signal energy, a signal pulse repeating station disposed at a known location displaced from said transmitting means and receiving apparatus in one of said paths and including means for heterodyning said pulses of high frequency signal energy with signal energy derived from said source to produce beat frequency signal pulses and for transmitting said beat frequency signal pulses to said receiving apparatus, means included in said receiving apparatus for heterodyning said pulses of high frequency energy with signal energy derived from said source to produce beat frequency signal pulses, and pulse transit time comparison means included in said receiving apparatus and excited by said beat frequency pulses to measure the difference in pulse transit times over said two different paths.

7. A pulse transit time radio location system, comprising a first transmitter for radiating a first signal of one frequency, a second transmitter for producing a pulsed signal of different frequency, a third transmitter for radiating a carrier signal at a third frequency, heterodyning means for heterodyning said first and pulsed signals to produce a pulsed reference signal, modulating means for modulating said pulsed reference signal upon the carrier signal radiated by said third transmitter, a receiving station, means at said receiving station for receiving and reproducing said first pulsed reference signal, means at said receiving station for heterodyning said first and pulsed signals to produce a second pulsed reference signal, and pulse transit time comparison means responsive to said pulsed reference signals for producing an indication representative of the relative positions of said receiving station and at least one of said transmitters.

8. A pulse transit time radio position determining system, comprising receiving apparatus, transmitting means for alternately transmitting signal pulses from a common point to said receiving apparatus over a first pair of different paths and a second pair of different paths, the relative lengths of each pair of paths determining the difference in pulse transit times over the different paths of the pair, one of the paths of each pair of paths including a transmitter remotely located relative to said transmitting means, means included in said one path of each pair of paths for heterodyning the signal pulses transmitted by said transmitting means with the signal radiated by the transmitter included in the one path of the other pair to produce reference pulses and for modulating the reference pulses on the signal radiated by the transmitter included in the same one of said paths for radiation thereby, and pulse transit time comparison means included in said receiving apparatus to measure the difference in pulse transit times over the paths of each pair.

9. A pulse transit time system of position determination, comprising two transmitters for radiating signals at different frequencies and at spaced radiation points, transmitting means for radiating pulsed signals alternately at two still different frequencies from at least one additional radiation point, means responsive to said pulsed signals for alternately modulating the signals radiated by said two transmitters with reference signal pulses, said radiated signals effectively producing a standing signal pattern in space characterized by two intersecting sets of spaced lines representative of different constant pulse transit difference intervals, and a receiving station including pulse transit time comparison means responsive to said pulsed signals and said pulsed reference signals for producing indications representative of the position of said receiving station relative to certain of the lines in each of said sets of lines.

10. A pulse transit time system of position determination, comprising two transmitters for radiating signals at different frequencies and at spaced radiation points, transmitting means for radiating pulsed signals alternately at two still different frequencies from at least one additional radiation point, means associated with each of said transmitters for heterodyning the signal radiated by the other transmitter with one of the signals radiated by said transmitting means to produce reference signal pulses and for modulating the reference signal pulses upon the signal radiated by the associated transmitter, and a receiving station including pulse transit time comparison means responsive to said pulsed signals and said pulsed reference signals for producing indications representative of the position of said receiving station relative to said transmitters.

11. A pulse transit time system of position determination, comprising two transmitters for radiating signals at different frequencies and at spaced radiation points, transmitting means for radiating pulsed signals alternately at two still different frequencies from at least one additional radiation point, means associated with each of said transmitters for heterodyning the signal radiated by the other transmitter with one of the signals radiated by said transmitting means to produce reference signal pulses and for modulating the reference signal pulses upon the signal radiated by the associated transmitter, a receiving station, means at said receiving station for receiving and reproducing said pulsed reference signals, means at said receiving station for heterodyning the pulsed signals radiated by said transmitting means alternately with the signals radiated by said transmitters to develop two additional pulsed reference signals, and pulse transit time comparison means at said receiving station excited by said pulsed reference signals for producing indications representative of the position of said receiving station relative to said transmitters.

12. A pulse transit time system of position determination, comprising spaced receiving and repeating stations, transmitter means for developing and radiating two signals having different frequencies, means for pulsing at least one of said signals, means at each of said stations for heterodyning said signals to produce beat frequency pulses, means for transmitting the beat frequency pulses developed at said repeating station to said receiving station, and pulse transit time comparison means at said receiving station responsive to the time displacement between corresponding pulses produced locally at said receiving station and transmitted to said receiving station from said repeating station for producing an indication of the relative positions of said stations.

13. A pulse transit time system of position determination, comprising spaced receiving and repeating stations, means at said receiving station for developing and radiating two signals having different frequencies, means for periodically pulsing at least one of said signals, means at each of said stations for heterodyning said signals to produce beat frequency pulses, means for transmitting the beat frequency pulses from said repeating station to said receiving station, and pulse transit time comparison means at said receiving station responsive to the time displacement between corresponding pulses produced locally at said receiving station and transmitted to said receiving station from said repeating station for producing an indication representative of the relative positions of said stations.

14. A pulse transit time system of position determination, comprising a repeating station having a known fixed position, a mobile station, transmitting means at said mobile station for developing and radiating a continuous signal of one frequency and a pulsed signal of different frequency, means at each of said stations for heterodyning said signals to produce beat frequency pulses, means for transmitting the beat frequency pulses developed at said repeating station to said mobile station, and pulse transit time comparison means at said mobile station responsive to the time displacement between corresponding pulses produced locally at said mobile station and transmitted to said mobile station from said repeating station for producing an indication of the position of the mobile station relative to said repeating station.

15. Wave signal receiving apparatus for translating received space radiated waves into position indications, comprising a receiver for receiving a first pair of space radiated waves at least one of which is pulsed and for heterodyning said waves to produce a first pulsed heterodyne signal, said receiver being alternatively operative to receive and reproduce a first pulsed reference signal modulated upon one of said first pair of radiated waves and derived from a second pair of radiated waves at least one of which is pulsed, a second receiver for receiving and heterodyning said second pair of radiated waves to produce a second pulsed heterodyne signal, said second receiver being alternatively operative to receive and reproduce a second pulsed reference signal modulated upon one of said second pair of waves and derived from said first pair of waves, and pulse transit time comparison means responsive to the time displacement between the pulses of said first heterodyne and second reference signals and between the pulses of said second heterodyne and first reference signals for producing indications representative of the position of said receiving apparatus relative to two displaced sources of said waves.

16. Wave signal receiving apparatus for translating received space radiated waves into position indications, comprising a receiver for receiving a first pair of space radiated waves at least one of which is pulsed and for heterodyning said waves to produce a first pulsed heterodyne signal, said receiver being alternatively operative to receive and reproduce a first pulsed reference signal modulated upon one of said first pair of radiated waves and derived from a second pair of radiated waves at least one of which is pulsed, a second receiver for receiving and heterodyning said second pair of radiated waves to produce a second pulsed heterodyne signal, said second receiver being alternately operative to receive and reproduce a second pulsed reference signal modulated upon one of said second pair of waves and derived from said first pair of waves, an oscilloscope including a cathode ray tube provided with a fluorescent screen, and means for controlling said oscilloscope to reproduce the pulses of said first and second heterodyne and reference signals on said screen, thereby to provide for visual determination of the time displacement between the pulses of said first heterodyne and second reference signals and between the pulses of said second heterodyne and first reference signals.

17. Wave signal receiving apparatus for translating received space radiated waves into position indications, comprising a receiver for receiving a first pair of space radiated waves at least one of which is pulsed and for heterodyning said waves to produce a first pulsed heterodyne signal, said receiver being alternatively operative to receive and reproduce a first pulsed reference signal modulated upon one of said first pair of radiated waves and derived from a second pair of radiated waves at least one of which is pulsed, a second receiver for receiving and heterodyning said second pair of radiated waves to produce a second pulsed heterodyne signal, said second receiver being alternately operative to receive and reproduce a second pulsed reference signal modulated upon one of said second pair of waves and derived from said first pair of waves, an oscilloscope including a cathode ray tube provided with a fluorescent screen, means for controlling said oscilloscope to reproduce the pulses of said first and second heterodyne and reference signals on said screen, thereby to provide for visual determination of the time displacement between the pulses of said first heterodyne and second reference signals and between the pulses of said second heterodyne and first reference signals, and means for further controlling said oscilloscope to effect reproduction of the pulses of said first and second heterodyne and reference signals in different zones of said screen.

18. Wave signal receiving apparatus for translating received space radiated waves into position indications, comprising a receiver for receiving a first pair of space radiated waves at least one of which is pulsed and for heterodyning said waves to produce a first pulsed heterodyne signal, said receiver being alternatively operative to receive and reproduce a first pulsed reference signal modulated upon one of said first pair of radiated waves and derived from a second pair of radiated waves at least one of which is pulsed, a second receiver for receiving and heterodyning said second pair of radiated waves to produce a second pulsed heterodyne signal, said second receiver being alternately operative to receive and reproduce a second pulsed reference signal modulated upon one of said second pair of waves and derived from said first pair of waves, an oscilloscope including a cathode ray tube provided with a fluorescent screen, means for controlling said oscilloscope to reproduce the pulses of said first and second heterodyne and reference signals on said screen, thereby to provide for visual determination of the time displacement between the pulses of said first heterodyne and second reference signals and between the pulses of said second heterodyne and first reference signals, and means for further controlling said oscilloscope to effect reproduction of said pulses of said first heterodyne and second reference signals one above the other in one zone of said screen and to effect reproduction of the pulses of said second heterodyne and first reference signals one above the other in a different zone of said screen.

19. A pulse transit time system of position determination comprising spaced receiving and repeating stations, transmitter means for developing and radiating two signals having different frequencies, means for pulsing at least one of said signals, means at each of said stations for heterodyning said signals to produce beat frequency pulses, means at said repeating station responsive to the beat frequency pulses developed at said repeating station for transmitting corresponding reference pulses to said receiving station, and pulse transit time comparison means at said receiving station responsive to the time displacement between said reference pulses and corresponding pulses produced locally at said receiving station for producing an indication of the relative positions of said stations.

JAMES E. HAWKINS.

REFERENCES CITED

The following references are of record in the file of this patent:

UNITED STATES PATENTS

| Number | Name | Date |
| --- | --- | --- |
| 1,981,884 | Taylor | Nov. 27, 1934 |
| 2,403,626 | Wolff | July 9, 1946 |
| 2,405,238 | Seeley | Aug. 6, 1946 |
| 2,419,525 | Alford | Apr. 29, 1947 |
| 2,433,283 | Luck | Dec. 23, 1947 |

FOREIGN PATENTS

| Number | Country | Date |
| --- | --- | --- |
| 577,824 | Great Britain | June 3, 1946 |
| 581,602 | Great Britain | Oct. 18, 1946 |
| 581,603 | Great Britain | Oct. 18, 1946 |